United States Patent [19]

Teraoka et al.

[11] Patent Number: 5,537,132
[45] Date of Patent: Jul. 16, 1996

[54] METHOD OF INFORMATION REFERENCE FOR HYPERMEDIA

[75] Inventors: Tadahiro Teraoka, Yokohama; Shinichiro Miyaoka; Makoto Kato, both of Kawasaki, all of Japan

[73] Assignee: Hitachi, Ltd., Tokyo, Japan

[21] Appl. No.: 63,122

[22] Filed: May 17, 1993

Related U.S. Application Data

[63] Continuation of Ser. No. 675,870, Mar. 27, 1991, abandoned.

[30] Foreign Application Priority Data

Mar. 30, 1990 [JP] Japan .................. 2-080725

[51] Int. Cl.$^6$ .................................................. G06F 15/40
[52] U.S. Cl. ........................ 345/133; 345/146; 395/155
[58] Field of Search ........................ 340/723, 721, 340/706, 712; 395/157, 158, 156, 155, 160, 133; 345/115, 120, 173, 146, 119, 145, 156, 179, 133

[56] References Cited

U.S. PATENT DOCUMENTS

| | | | |
|---|---|---|---|
| 4,698,625 | 10/1987 | McCaskill et al. | 340/709 |
| 4,847,604 | 7/1989 | Doyle | 340/706 |
| 4,999,790 | 3/1991 | Murayama et al. | 340/706 X |
| 5,208,909 | 5/1993 | Corona et al. | 395/155 |
| 5,307,457 | 4/1994 | Beitel et al. | 395/155 |
| 5,371,553 | 12/1994 | Kawamura et al. | 348/734 |

FOREIGN PATENT DOCUMENTS

| | | |
|---|---|---|
| 2-01059 | 1/1990 | Japan . |
| 2-18669 | 1/1990 | Japan . |
| 2-15372 | 1/1990 | Japan . |
| 2-61768 | 3/1990 | Japan . |
| 2-64868 | 3/1990 | Japan . |

OTHER PUBLICATIONS

Nikkei Computer, Jan. 2, 1989, pp. 41–47. (Translation Unavailable).
ASCII, vol. 13, No. 10, Oct. 1989. (Translation Unavailable) "Hypertext", pp. 222–231.

*Primary Examiner*—Richard Hjerpe
*Assistant Examiner*—Kara Farnandez Stoll
*Attorney, Agent, or Firm*—Fay, Sharpe, Beall, Fagan, Minnich & McKee

[57] ABSTRACT

An information reference method includes a computer, a storage unit for storing display information to be processed by the computer, a display unit for displaying display information stored in the storage unit, and an indication unit for indicating any desired point on the screen of the display unit. The information reference method comprises a step for displaying a portion of display information stored in the storage unit, a step for indicating any desired point of a display image on the screen by the indication unit, and a step for selecting one of a plurality of display information linked in advance to a displayed image. The information retrieval method further comprises a step for providing, within display information, link information for showing the degree of relevancy between a displayed image and the plurality of display information, and a step for mutually comparing link information at an indicated point to decide display information to be selected.

5 Claims, 5 Drawing Sheets

$L_B > L_A > L_C$ $L_B > L_A > L_C$

METHOD OF INFORMATION REFERENCE FOR HYPERMEDIA

This is a file-wrapper continuation of application Ser. No. 07/675,870 filed on Mar. 27, 1991, now abandoned.

BACKGROUND OF THE INVENTION

The present invention relates to a method of information reference in a hypermedia systems including electronic brochures and electronic encyclopedias.

DESCRIPTION OF THE RELATED ART

According to the conventional method of information reference, the shape of a key area (hereinafter referred to as a key) is defined, and information corresponding to the key is referenced only when a point within the defined area is indicated by a user, as described in the NIKKEI COMPUTER (Jan. 2, 1989, pp 41–47).

In the above-described conventional method, information cannot be referenced when a point indicated by a user is not in a defined key area. Therefore, under the conventional method it is necessary for the user to accurately indicate a point inside the key area.

For example, in a picture of natural beauty or scenery, generally no specific area is indicated because of the high consideration given to an overall visual effect. As a result, it is difficult to make an accurate indication of an area when the key area is small, or when a plurality of key areas are adjacently linked or when there is no key area at a portion where a user who wants to retrieve information believes a key area exists.

SUMMARY OF THE INVENTION

It is an object of the present invention to provide an information reference method which does not require the high degree of accuracy in indicating a key area for reference information which enables information hypermedia systems to provide improved information reference, and which facilitates addition and deletion of key areas.

In order to achieve the above object of the present invention, keys for information reference are distributed on a displayed image. Degree of relevance values are values for showing the degree relevancy between a displayed image and information to be referenced. A plurality of the degree of relevancy values obtained are mutually compared with each other at a desired point on the displayed image to determine which information should be referenced.

Further, a register such as a counter for counting a frequency of information referenced is provided at the display image side which corresponds to the reference information linked to the displayed image.

By the above arrangement, it is possible to obtain all degree of relevance values of the information linked to an image, so that invalid areas which exist cannot become key areas. Also, it is not necessary to have the user indication accuracy of the prior art.

According to the information reference method of the present invention, key areas where link information can be obtained include key areas which may be overlapped. Therefore, new link information may be added without regard to the existing structure of key areas.

As described above, the present invention is characterized in that degree of relevance values are calculated with respect to coordinate values at an indicated point on displayed images. These degree of relevance values are numerical values for showing degrees of correlation between coordinant points of the displayed images and information that can be fetched from these coordinates values. Degree of relevance values are numerical values and therefore, do not overlap. As a result, parameters for determining a distribution shape are provided as link information corresponding to call information, and degree of relevance values of each call information are obtained from parameters of respective link information and coordinates values of an indicated point, eliminating reference to other link information. Accordingly, preparation of a link, that is adding or deleting a link, can be carried out without regard to links already set.

DESCRIPTION OF THE PREFERRED EMBODIMENTS

Figure 1:
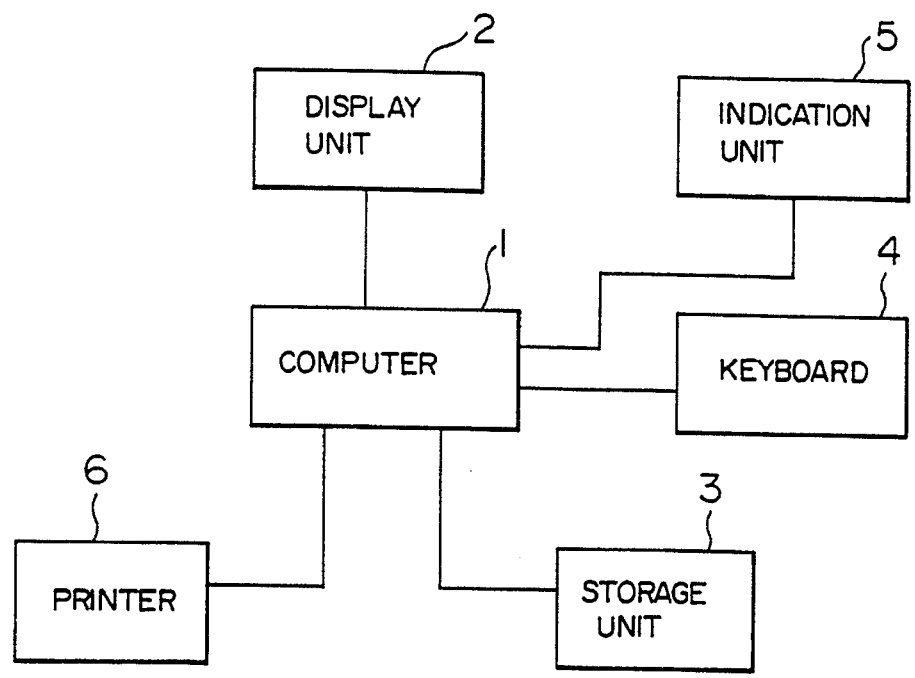
FIG. 1 is a block diagram showing the configuration of an information retrieval unit relating to the present invention.

FIG. 1 shows a system configuration of a commercial product presentation system, a so-called electronic brochure relating to one embodiment of the present invention. In FIG. 1, an image stored in a storage unit 3 is fetched by a computer 1 and is displayed on the screen of a display unit 2. In this case, an indication unit 5 is employed by a user to point to a position on the screen. Upon request, other images relating to the point indicated are fetched from the storage unit 3 and outputted on the display unit 2. For example, when a side view of a car is displayed on the display unit 2, the front side of the car can be pointed to or indicated on the screen using the indication unit 5. Thereafter, a front view of the car is displayed on the screen. Similarly, a rear side view of the car can be displayed on the screen when the rear side of the car is pointed out or indicated using the indication unit 5.

Figure 2:
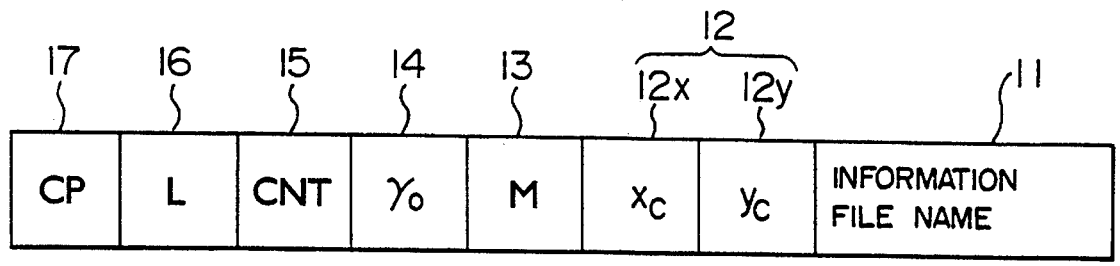
FIG. 2 shows a structure of link information provided at a header portion of an image file to be used in the information reference method relating to the present invention.

In order to enable such referencing of information as described above, according to the present invention, the image files all include a link information having a structure as shown in FIG. 2 at the header portions. Referring to FIG. 2, 11 designates an information file name area, 12 an area of coordinates values (an x coordinates value in 12x and a y coordinates value in 12y) relating to a representative point of a key area of which reference information can be sought, 13 designates an area of a degree of relevancy value M (a value which shows relevancy between image information having the link information in FIG. 2 and the information shown by the information file name area 11) at the coordinates of a representative point indicated by the coordinates value area 12, 14 an area showing a distance $\gamma_0$ from the coordinates point, at which point the degree of relevance value becomes zero, and 15 designater CNT a counter area for recording the frequency at which the file has been fetched.

17 designates CP a chain pointer for connecting link information when there are a plurality of link information.

16 designates an area for storing a degree of relevancy value (hereinafter represented by L) at an indication position. In the present embodiment, a link intensity value is obtained by the following expression:

$$L = M - M \frac{\gamma}{\gamma_0} \quad (1)$$

where $\gamma$ represents a linear distance from a representative point to an indication position. $\gamma$ can be obtained by the following expression when the coordinates of the representative point and the indication position are given as (xc, yc) and (x, y) respectively:

$$\gamma = \sqrt{(x-xc)^2 + (y-yc)^2} \quad (2)$$

Figure 3:
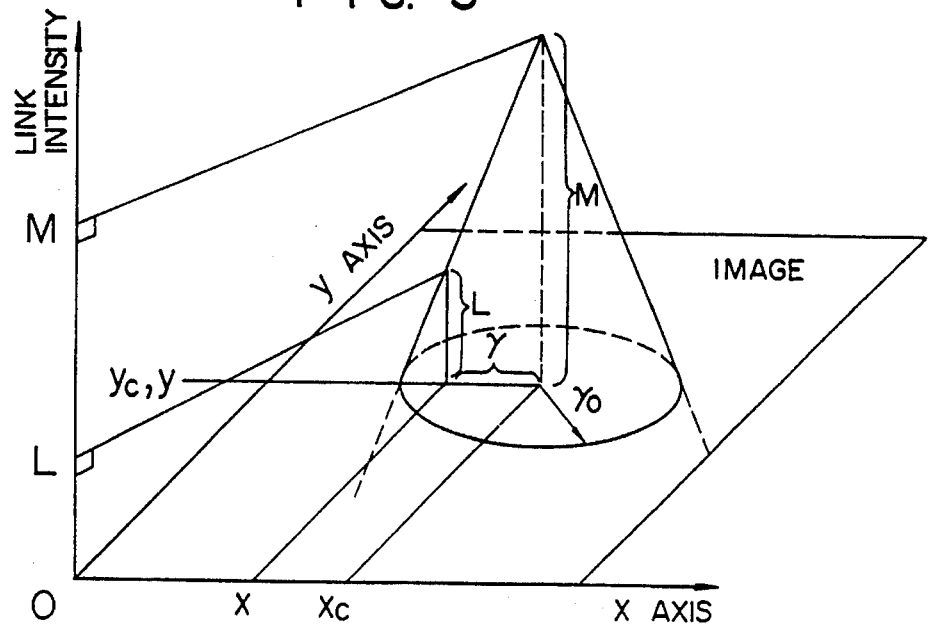
FIG. 3 shows a relationship between degree of relevance values included in the link information in FIG. 2 and indication positions.

FIG. 3 shows a relationship between the above expressions (1) and (2). In FIGS. 3, coordinates xc and yc are values given by the area 12 of the link information as shown in FIG. 2 and are substituted for xc and yc of the expression (2). Similarly, the value M of FIG. 3 is obtained from the area 13 of FIG. 2 and substituted for M of the expression (1). Coordinates x and y of FIG. 3 are values of coordinates pointed to by a user, and $\gamma$ is obtained by substituting these coordinates in the expression (2). As shown in FIG. 3, when the coordinates x and y pointed to by a user is within a range of $\gamma_0$ centering at the coordinates xc and yc, then the link intensity value L has a positive value (but not constant), and in other cases the intensity value has a negative value. The link intensity value L is obtained at any desired position on a display surface from the expressions (1) and (2). However, the link intensity having a negative value is invalidated since the relation of a portion of display surface pointed to by a user and the information given by the field 11 of FIG. 2 is quite low, and since it is not proper to provide the information obtained from the field 11 to a user. Accordingly, the substantial key area is within a circle $\gamma_0$ centering at the coordinate values xc and yc, where the link intensity has a positive value.

Figure 6A:
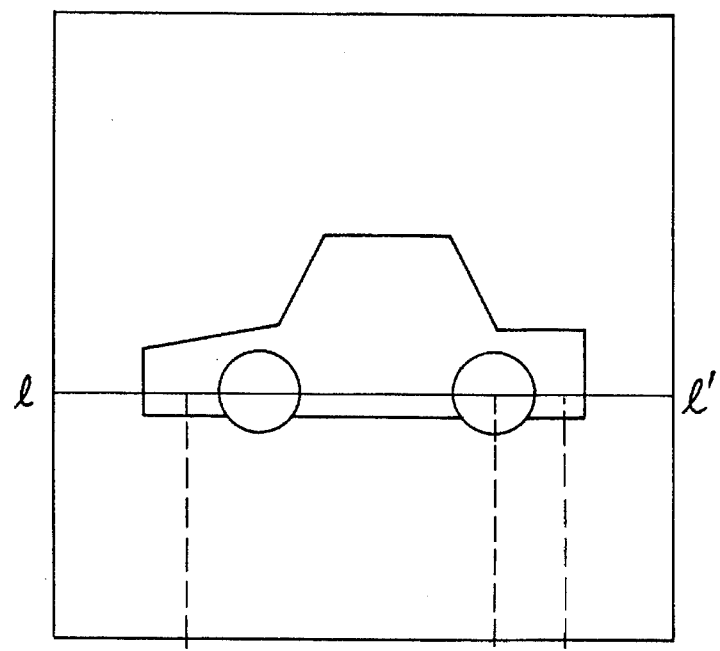
FIGS. 6A and 6B show states of distribution of degree of relevance of information linked to an image.
Figure 6B:
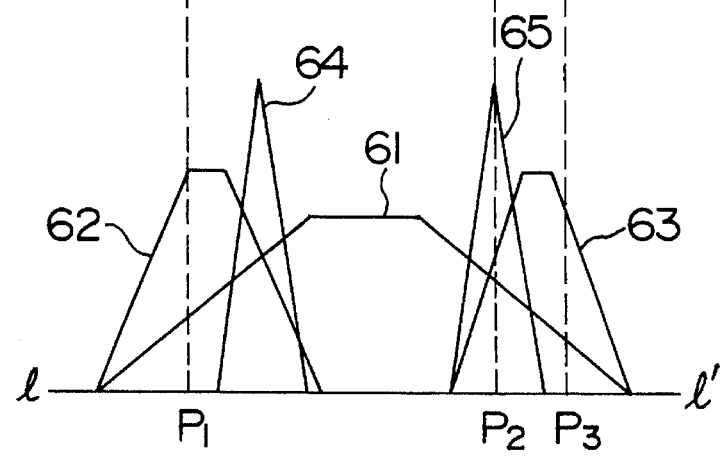

FIGS. 6A and 6B show an example of a side view of a car. FIG. 6A shows an image displayed on the screen of the display unit 2, and FIG. 6B shows the degree of relevancy values on a line 1—1' in FIG. 6A.

Assuming that there are four types of information, i.e. an outline, a front view, a rear side view and a detailed explanation of tires which are linked to the image of FIG. 6A, then, in FIG. 6B, the degree of relevancy values on the line 1—1' are given by 61 for the outline, 62 for the front view, 63 for the rear side view, and 64 and 65 for the tire explanation, respectively.

At points $P_1$, $P_2$ and $P_3$ on the line 1—1', the degree of relevancy is highest for the front view, the tire explanation and the rear side view, respectively. By this arrangement, it becomes possible to fetch the outline when a certain point is selected randomly on the screen and to fetch specific display information at a desire point when that point is selected intentionally.

Next, a reference procedure will be explained with reference to the flow chart in FIG. 4 and FIGS. 5A to 5D. FIGS. 5A to 5D show states of link information either before or after steps in FIG. 4.

Figure 5A:
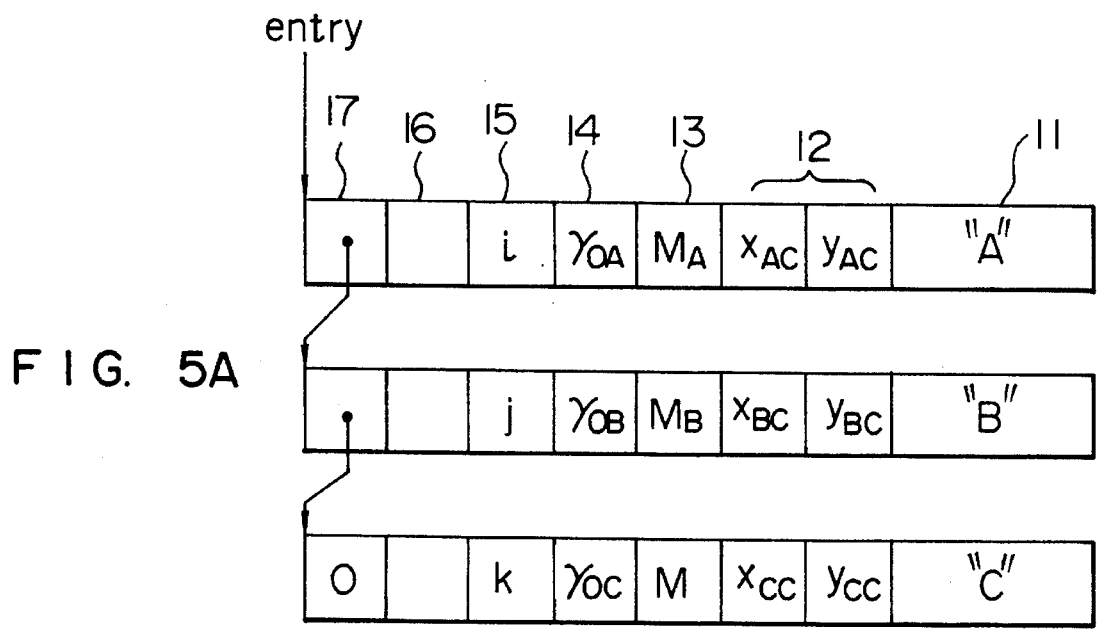
FIGS. 5A through 5D show changes of states of link information corresponding to each step of the flow chart in FIG. 4.

Immediately after the steps have been started, link information is as shown in FIG. 5A. (Non-entered areas show that no consideration is required to be given to these areas.)

Figure 5B:
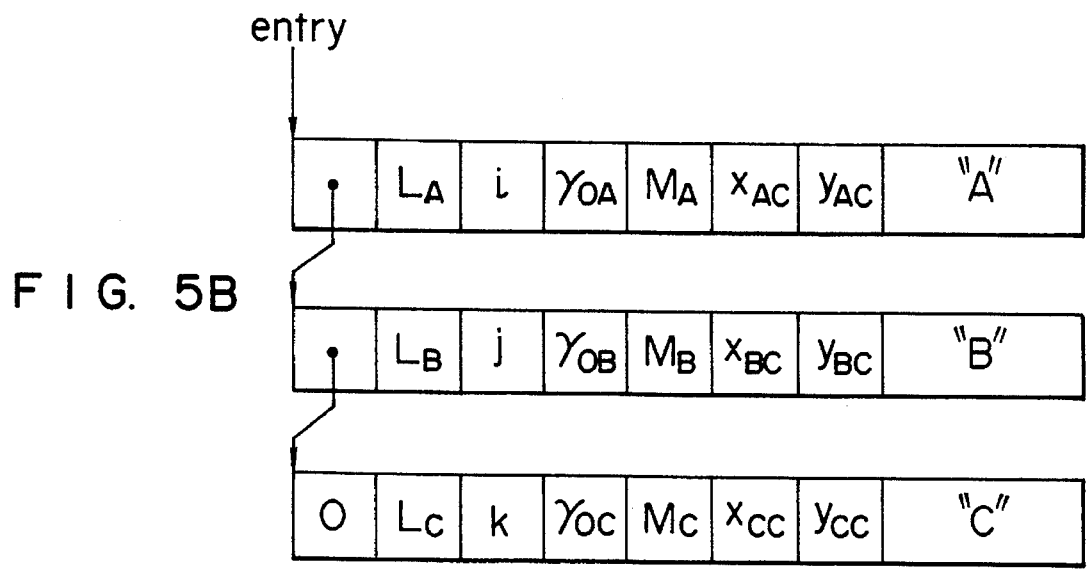

At step 100, the degree of relevancy at an indicated position is calculated by using the expressions (1) and (2), the result of which is stored in area 16. In the case of FIGS. 5A to 5D, the number of repetition becomes N=3. Assuming $L_A$, $L_B$ and $L_C$ to be the degree of relevancy values obtained, FIG. 5B is obtained.

Figure 4:
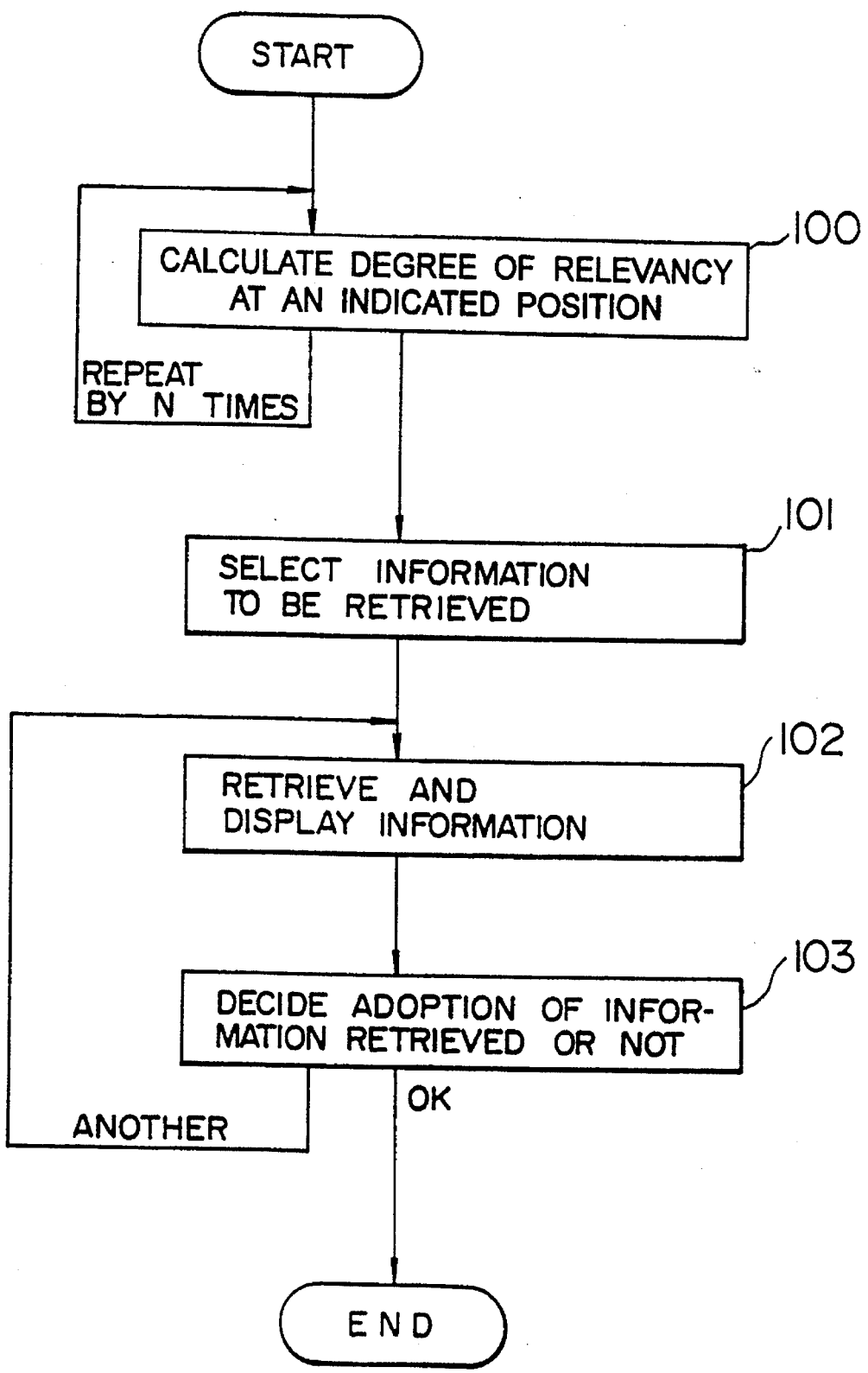
FIG. 4 is a flow chart of information relevance relating to the information reference method of the present invention.

The N-time repetitive processing in the Step 100 in FIG. 4 is carried out as follows.

Link information is managed by being connected in a chain through a chain pointer. The chain pointer has a value which indicates the link information that follows next. When this value is zero, it is regarded that the link information shows an end terminal of the chain. Accordingly, when the value of the chain pointer is zero after a degree of relevancy value has been calculated at the Step 100, the processing goes to step 101. Unless the value of the chain pointer is zero, the next link information is read to calculate a degree of relevancy value at the Step 100.

Figure 5C:
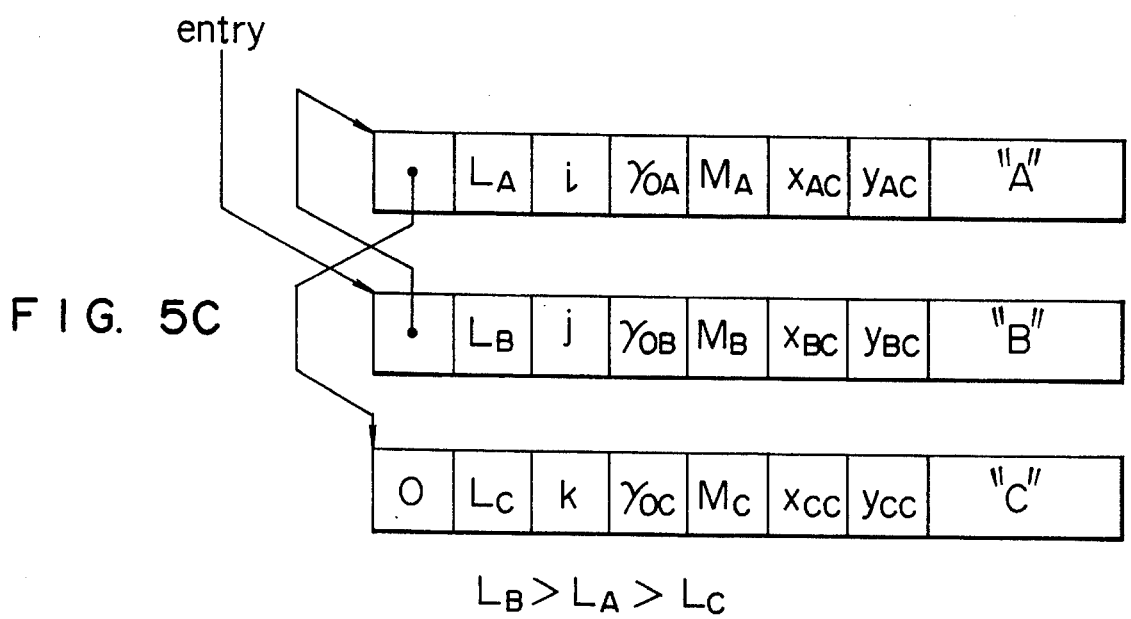

At the Step 101, sizes of the degree of relevancy values obtained at a the Step 100 are compared and the degree of relevancy values are sorted according to their magnitude. Orders of the degree of relevancy values are rearranged by operating the chain pointer in the area 17. When the magnitudes of the degree of relevancy values are in order of $L_B > L_A > L_C$, a state as shown in FIG. 5C is obtained.

When the degree of relevancy values are equal, a degree of relevancy value with a larger value in the counter 15 has a high priority. For this purpose, the areas 17 and 16 are combined together (with the area 17 as a high order area and the area 16 as a low order area) whereafter, the values are compared.

At Step 102, a file shown in the information file name area 11 in the header link information is read out and displayed in the display unit 2.

When a degree of relevancy value is zero or smaller, a compressed image of all the information, including information titles, are displayed in one list in the display unit 2. Since the degree of relevancy values have been sorted in descending order all the values are zero or below when the header value is zero or below.

Figure 5D:
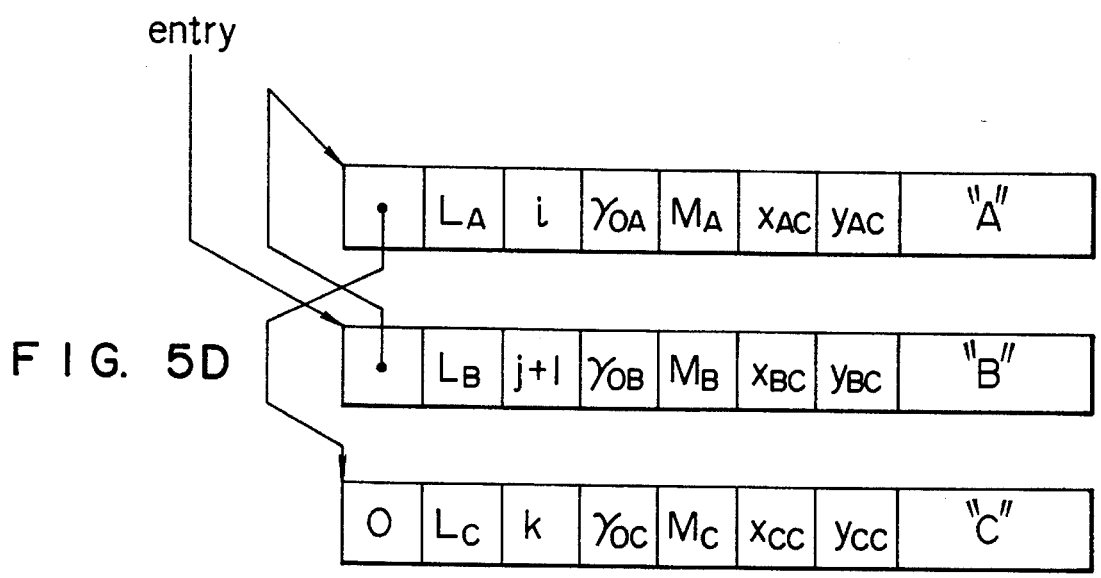

At Step 103, an indication based on a decision by the operator is awaited. In this case, a small area having a display of "ANOTHER" is displayed in one part on the screen. When this small area has been indicated, the processing goes back to the Step 102 and the information display is changed to a one which is related to the next link information. When an indication other than this has been made, it is assumed that the selected information has been adopted and the value of the counter 15 corresponding to this information is increased by one (FIG. 5D is referred to).

When the list is displayed, "ANOTHER" is not displayed and the following message is displayed instead:

"Information having high relevance to the currently designated point has not been recorded. However, a list of information that can be referenced from this image is displayed. Please select information from this list."

When certain information has been selected, the value of the counter 15 corresponding to this information is increased by one.

When the value of the counter 15 has exceeded a predetermined value (or when the value of the counter 15 has overflowed when there is no predetermined value or when the predetermined value is zero), the value of $\gamma_0$ (or the value of M) is increased by a predetermined value so that a corresponding key area is expanded.

The present invention can also be applied to the case where a cloth of a desired color is to be selected from a plurality of cloths having different colors.

In this case, when a certain color has been designated, a plurality of colors corresponding to the degree of relevancy of the designated color are provided so that a degree of freedom of selection can be made larger.

As described above, there are following effects according to the present invention:

The degree of relevancies distributed on the screen are used as information reference keys so that key areas can be overlapped.

Addition or deletion of information links can be made without regard to preexisting links.

A frequency of referencing information is counted so that a counted result can be provided.

A distribution state changes depending on the frequency of information retrieval so that key areas can be optimized in the course of the use of the procedure.

We claim:

1. An information retrieval method which includes a computer, a memory storage for storing display information to be processed by said computer and information to be retrieved, a display for displaying the display information stored in said storage, output means for outputting the retrieval information, and an indicator for indicating a desired point on a screen of said display comprising:

displaying display information stored in said storage on said display;

pointing to a desired point of a displayed graphical image on the screen by said indicator;

providing link information containing a plurality of degree of relevancy values relative to the displayed graphical image, said degree of relevancy values being screen location dependent and having correlation between the desired point and information that can be fetched by retrieving, wherein said degree of relevancy values are calculated by applying coordinates of the desired point and link information parameters to a distribution function;

comparing said degree of relevancy values contained in said information relative to the desired point and choosing for output selected retrieved information in accordance with the comparison; and outputting the chosen information to said output means.

2. An information retrieval method, in a system which includes:

a computer;

a storage device for storing display information to be processed by said computer;

a display for displaying the display information stored in said storage device;

an indicator for indicating any desired point on a screen of said display, the method comprising the steps of:
      pointing to any desired point of a displayed graphical image on the screen by said indication means;

providing link information for calculating degree of relevance values;

calculating the degree of relevance values of said display information with respect to the desired point by applying coordinates of the desired point and necessary link information parameters of said display information to a distribution function, said degree of relevancy values being screen location dependent and having correlation between the desired point and information that can be fetched;

comparing the calculated degree of relevance values and deciding what information stored in said storage device is to be selected in accordance with the comparison; and selecting and displaying the decided information stored in said storage device in said display.

3. An information retrieval method comprising the steps of:

displaying a graphical image on a screen of a display device comprising selected display information stored in a storage device;

pointing to any desired point of the displayed graphical image on the screen by an indicator for indicating a relevant portion of the display information;

selecting the relevant portion of the display information linked in advance to the displayed graphical image;

providing link information within said display information for calculating degree of relevance values of image elements within the relevant portion;

calculating the degree of relevance values of the image elements with respect to the indicated point based on said link information by applying coordinates of the desired point and necessary link information parameters to a distribution function, said degree of relevance values being screen location dependent and having correlation between the desired point and information that can be fetched; and comparing the calculated degree of relevance values and deciding what information stored in said storage device is to be selected in accordance with the comparison.

4. A method of selecting one of a plurality of stored reference files linked to a point indicated by a user on a display screen comprising:

accessing the plurality of stored reference files from an associated memory;

generating a degree of relevancy signal for each of the plurality of stored reference files by applying coordinates of the indicated point and necessary link information parameters to a distribution function, the degree of relevancy signals being screen location dependent and having correlation between the indicated point and the stored reference files;

comparing the degree of relevancy signal of each of the plurality of stored reference files and generating a comparison signal as a result of the comparing;

selecting a stored reference file with a highest degree of relevancy signal in accordance with the comparison signal.

5. A method of selecting one of a plurality of stored reference files linked to a point indicated by a user on a display screen comprising:

accessing the plurality of stored reference files from an associated memory;

generating a degree of relevancy signal for each of the plurality of stored reference files, the degree of relevancy signals being screen location dependent and having correlation between the indicated point and the stored reference files, the degree of relevancy signal for each of the plurality of stored reference files being generated from relations $L=M-M(\gamma/\gamma_0)$ and $\gamma=((x-xc)^2+(y-yc)^2)^{1/2}$, where x and y are rectangular coordinates of the display point indicated, xc and yc are rectangular coordinates of a reference point on the display, $\gamma_0$ is a radial coordinate extending from xc and yc and M is a degree of relevancy value for each of the plurality of stored files when the rectangular coordinates of the display point indicated coincide with the rectangular coordinates of the reference point;

comparing the degree of relevancy signal of each of the plurality of stored reference files and generating a comparison signal as a result of the comparing; and selecting a stored reference file with a highest degree of relevancy signal in accordance with the comparison signal.

* * * * *

UNITED STATES PATENT AND TRADEMARK OFFICE
CERTIFICATE OF CORRECTION

PATENT NO. : 5,537,132
DATED : July 16, 1996
INVENTOR(S) : Tadahiro Teraoka, et al.

It is certified that error appears in the above-indentified patent and that said Letters Patent is hereby corrected as shown below:

Claim 5, column 6, line 46, after "signal" insert --L--.

Signed and Sealed this

Eighth Day of October, 1996

Attest:

BRUCE LEHMAN

Attesting Officer     Commissioner of Patents and Trademarks